W. T. REASER.
WATER-WHEEL.

No. 190,970. Patented May 22, 1877.

Witnesses: Inventor

W. T. REASER.
WATER-WHEEL.

No. 190,970. Patented May 22, 1877.

Witnesses:
Inventor
Warren T. Reaser,
by DeWitt C. Allen,
atty.

W. T. REASER.
WATER-WHEEL.

No. 190,970. 4 Sheets—Sheet 3. Patented May 22, 1877.

Witnesses:
Inventor:

W. T. REASER.
WATER-WHEEL.

No. 190,970. Patented May 22, 1877.

Witnesses:
Inventor.
Warren T. Reaser
by DeWitt C. Allen
Atty.

UNITED STATES PATENT OFFICE.

WARREN T. REASER, OF WAUPUN, WISCONSIN.

IMPROVEMENT IN WATER-WHEELS.

Specification forming part of Letters Patent No. 190,970, dated May 22, 1877; application filed May 7, 1877.

*To all whom it may concern:*

Be it known that I, WARREN T. REASER, of Waupun, in the county of Dodge, and State of Wisconsin, have invented certain new and useful Improvements in Water-Wheels; and I do hereby declare that the following is a full, clear, and exact description of the same, reference being made to the accompanying drawings, forming a part of this specification, and in which—

Figure 1:
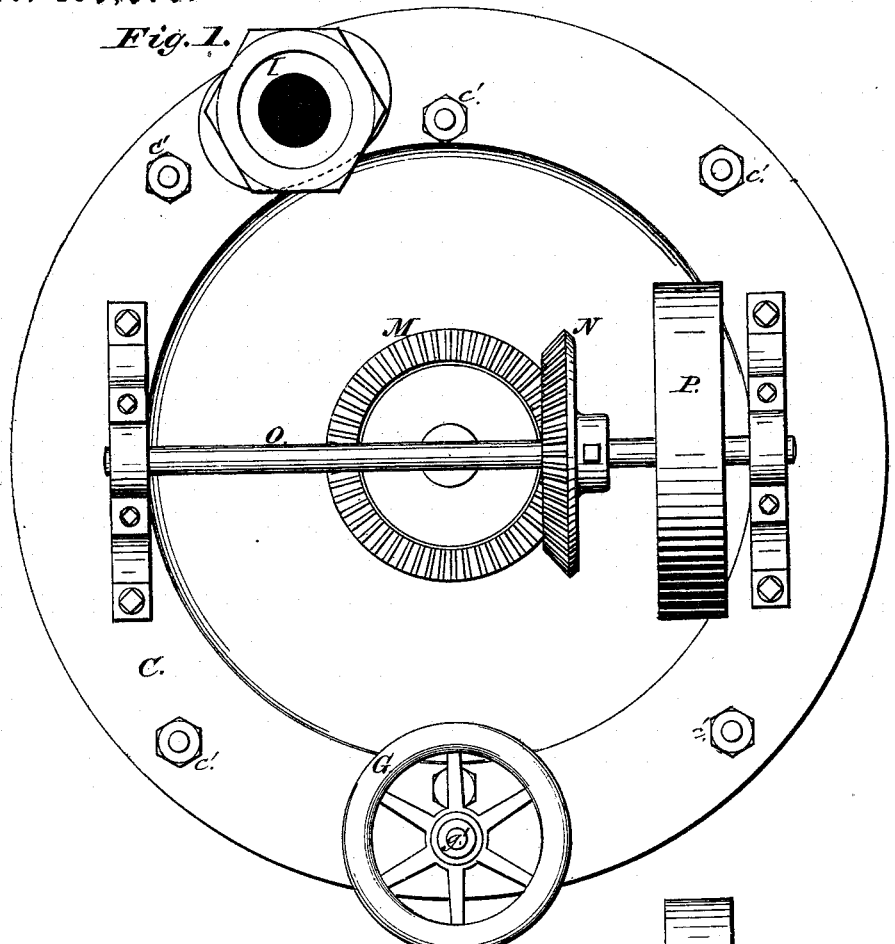
Figure 2:
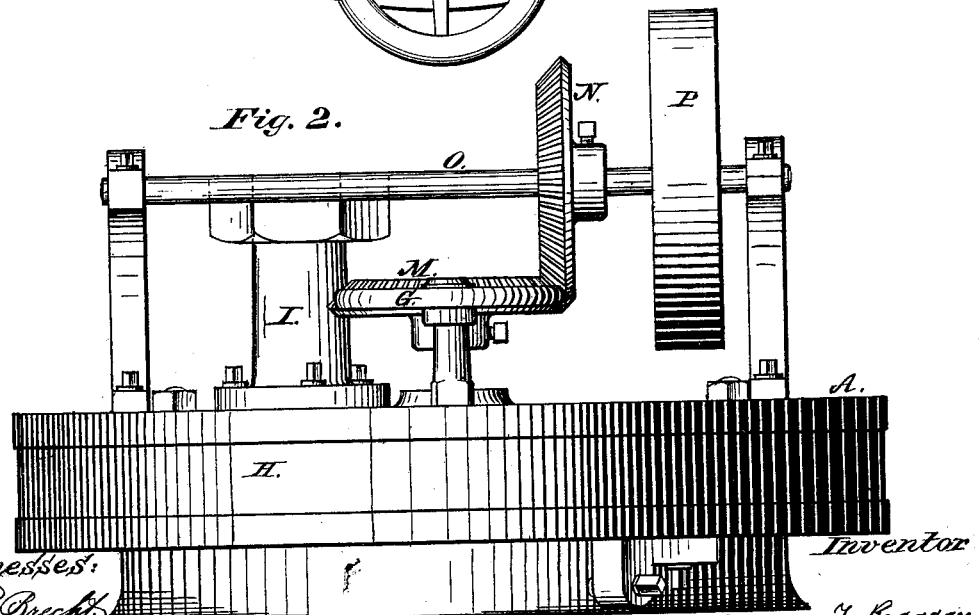
Figure 3:
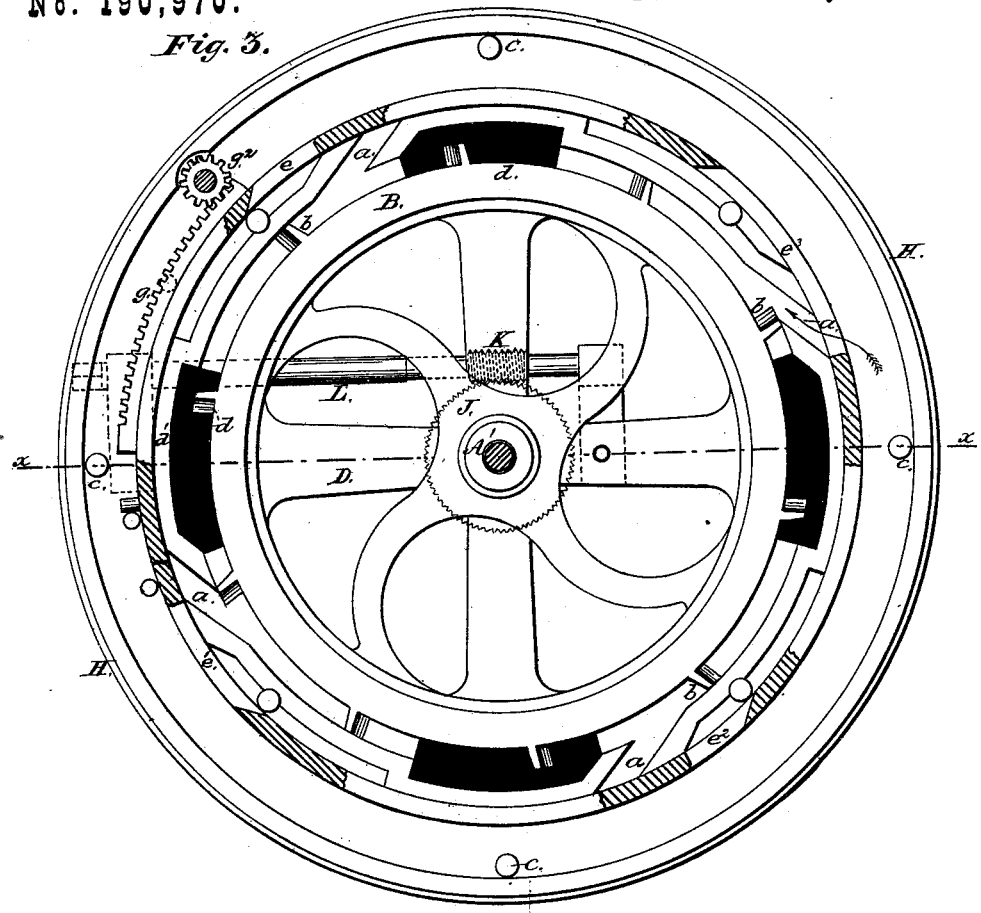
Figure 4:
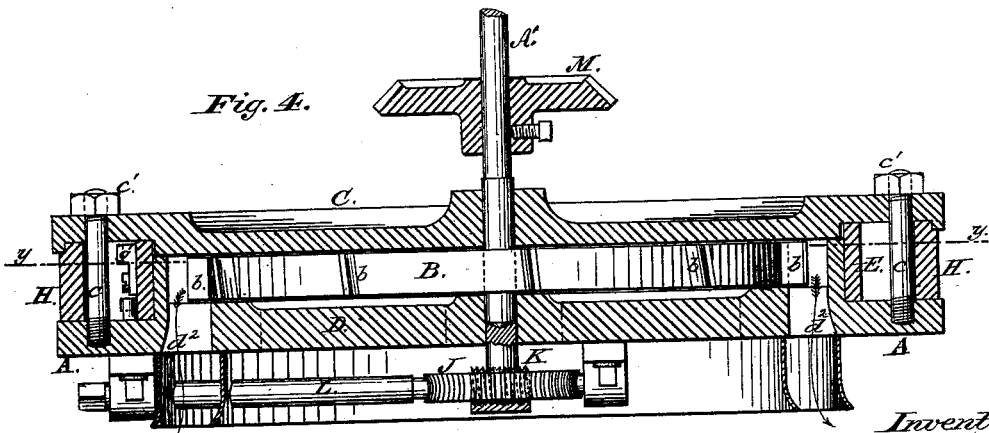
Figure 5:
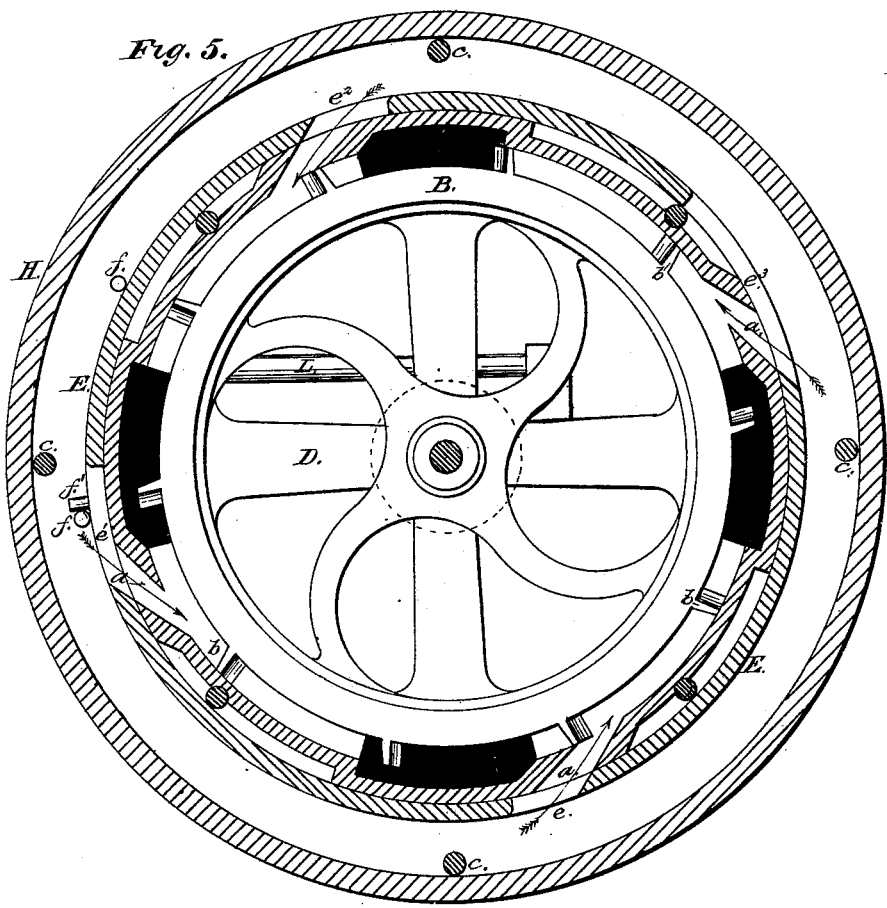
Figure 6:
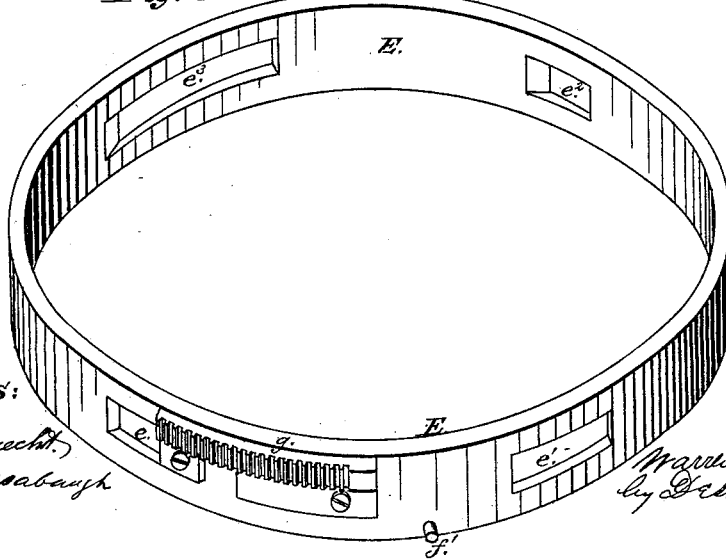

Figure 1 is a top or plan view. Fig. 2 is a side elevation. Fig. 3 is a plan view, with the top of the case removed. Fig. 4 is a cross-section on the line $x\ x$ of Fig. 3, with a side elevation of the wheel. Fig. 5 is a horizontal section on the line $y\ y$ of Fig. 4. Fig. 6 is a perspective view of the annular gate.

The object of my invention is to produce a water-wheel in which the water is readily discharged after acting upon the wheel, without retarding its movement; and also a water-wheel which can be readily adapted to flumes, or as a portable wheel.

My invention relates to improvements in the class of side-feeding water-wheels; and it consists in the combination, with a horizontal wheel having arms or buckets upon its periphery, of an inclosing-case having two or more side feed-openings, and two or more discharge-openings in the bottom of the case, near the outer skirt or periphery thereof; it further consists of an annular gate surrounding the case; and it finally consists in the combination, with the case, of an outer removable ring, whereby the wheel can be adapted to flumes, or as a portable wheel, all as hereinafter fully described.

A in the drawings represents the case or curb within which the horizontal wheel B is placed. The case or curb and wheel may be of any desired dimensions, in accordance to the power required and the volume or supply of water desired to drive the wheel.

C represents the top of the case, and which is secured thereto by the screw-bolts and nuts $c\ c'$, said bolts $c$ being secured to the bottom of the case.

The wheel B is provided on its periphery with a series of oblique arms or buckets, $b$, inclining forward in the direction of the movement of the wheel from the top to the bottom thereof, as clearly shown in Fig. 4, whereby the water striking said arms or buckets will raise or hold the wheel from off its step, thereby preventing friction and wearing of the wheel upon the bottom of the case.

The case is provided with two or more tangential side or feed openings, $a$, through which the water passes to the wheel, said openings flaring outwardly at their mouths, for the purpose of gathering and forming the current of water to act upon the wheel. The case or curb should be of such thickness that the side or feed openings will form a volume of water, the power of which will be exerted directly upon the arms or buckets of the wheel, and which is fully accomplished by arranging the feed-openings at such an angle, "about sixty degrees more or less tangential to the radius of the wheel," so that the water will pass almost in a straight line from the feed-openings to the discharge-openings $d$, in the outer or skirt portion of the bottom of the case.

By having the case or curb of the required thickness desired for the feed-openings, it can be recessed out, as shown at $d^1$, Fig. 3, to enlarge the discharge-openings, and also made flaring outwardly toward the bottom of the case, as shown at $d^2$, Fig. 3, so that the water will be discharged more freely and quickly from out of the case.

The arms or buckets of the wheel just clear the case in the spaces between the feed and discharge openings, said spaces forming chutes, in which the water is confined so as to act directly upon the arms or buckets of the wheel, and almost in a straight line from the feed to the discharge openings, so that when it arrives at the discharge-openings it will be quickly discharged from the case, outside of the line of the pull of the current, upon the arms or buckets of the wheel, from the feed to the discharge openings, so as not to retard the movement of the wheel.

Around the case or curb is arranged an annular gate, E, for regulating the quantity of water desired to be fed to the wheel. In the present instance the gate is provided with openings $e\ e^1\ e^2\ e^3$ to correspond with the number of feed-openings in the case, and they are arranged at nearly equal distances apart around the gate, and so that the openings $e$ $e^2$ are directly opposite of each other. These two openings $e\ e^2$ are of the same size, and correspond with the size of the feed-openings, while the opening $e^1$ is twice as long as the openings $e\ e^2$, and the opening $e^3$ three times as long, or a third larger, than opening $e^1$, all as clearly shown in Fig. 6, and for a purpose hereinafter described.

This gate has a rotary reciprocating movement around the case or curb, sufficient to open or close all of the feed-openings, and is limited in its movement by the stops $f\ f$, against which the projecting pin $f'$ of the gate strikes. By having the two openings $e^1$ and $e^3$ of different lengths I am enabled to close one, two, or three of the feed-openings, and still leave the remaining one or ones with a full column or head of water on.

The annular gate is provided on its periphery with a rack, $g$, and said gate is operated by a hand-wheel, G, outside of the case, having a shaft, $g^1$, extending below the top or into the case, and provided with a pinion, $g^2$, which meshes with the rack $g$.

When the feed-openings are all closed by the gate one half-revolution of the hand-wheel will turn the gate so as to open all of the feed-openings. One complete revolution of the hand-wheel will close two of the feed-openings, and one and a half revolution will close three of the feed-openings, while two complete revolutions will close all of the feed-openings.

Figure 7:
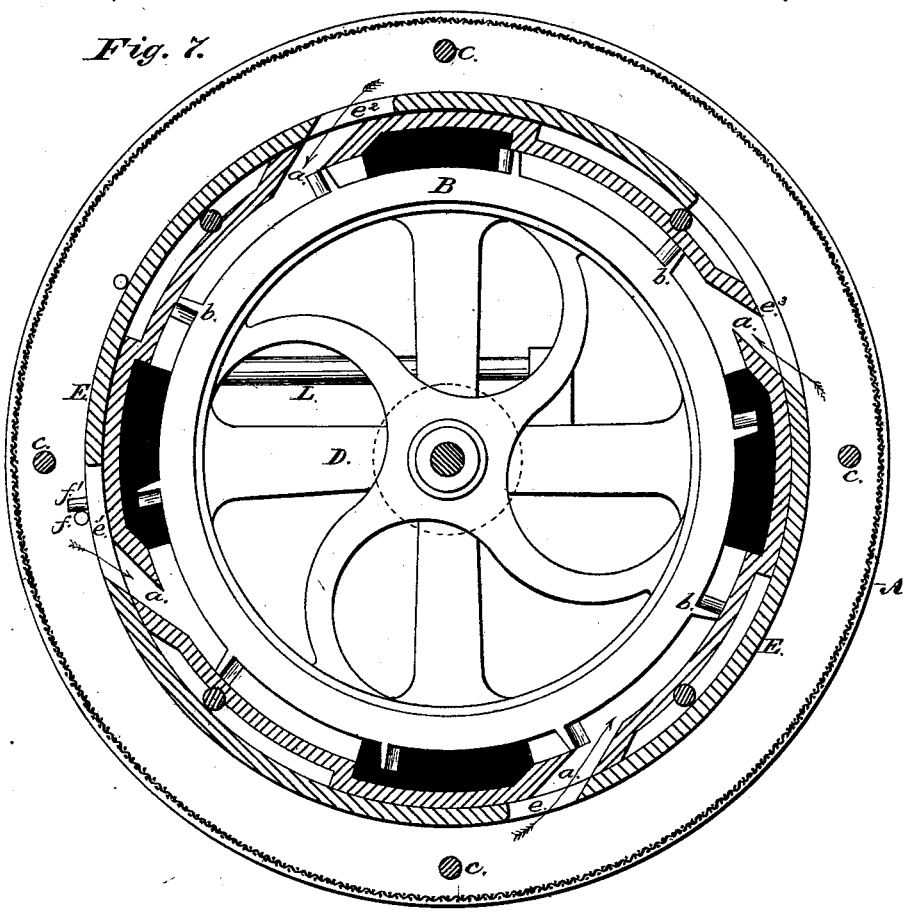
Figure 8:
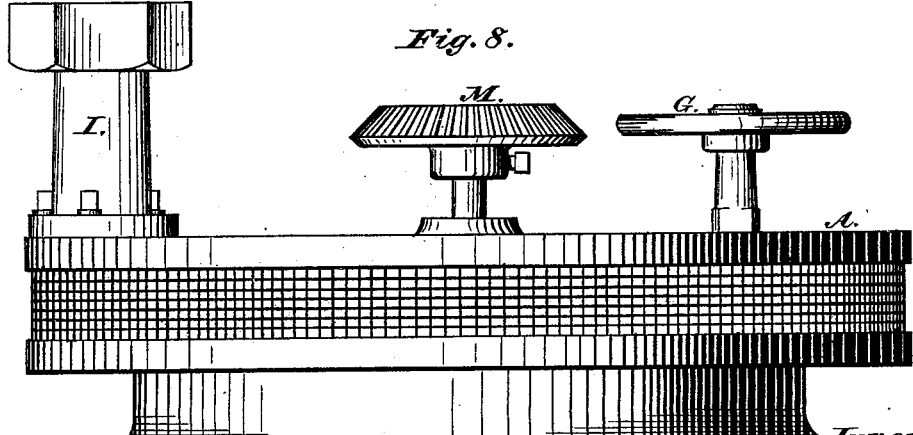

The top and bottom of the case extend outside of the curb inclosing the wheel far enough so that, when the removable ring H is secured in position, a flume is formed inside, whereby the wheel is adapted as a portable wheel, the water being fed into the flume formed therein through the opening J in the top of the case. By removing the ring H the wheel is adapted for flumes, and when used for flumes a circular screen of wire-netting or other suitable material, made in sections and secured between the top and bottom plates of the case, could be substituted for the ring H, which would readily admit the water to the wheel, and prevent sticks and other material from getting inside and clogging the wheel, all as clearly shown in Figs. 7 and 8 of the drawings.

By increasing the number of arms or buckets upon the wheel, the length of the spaces or chutes between the feed and discharge openings can be shortened, and the discharge-openings made correspondingly longer. Therefore, increasing the number of arms or buckets upon the wheel will make a corresponding increase in the discharge, which is very desirable when I desire to decrease the length of the current acting or pulling upon the arms or buckets of the wheel, so as to bring the current on a direct line from the feed to the discharge openings.

I do not desire to confine myself to the number of feed and discharge openings herein shown, as in small wheels two or three would answer equally well, while in large wheels I might desire or require six, eight, or more feed and discharge openings.

The step of the wheel-shaft A' is formed in the pinion J, and the wheel can be adjusted by turning the shaft L, having a worm-gear, K, which meshes with the pinion J.

The operation of my improved wheel is obvious from the foregoing description, and the power derived therefrom is transmitted from the wheel-shaft to the band or other wheel P, upon the horizontal shaft O, through the medium of the bevel-gears M N arranged, respectively, upon the wheel and horizontal shafts.

I do not desire to confine myself to the precise arrangement of the arms or buckets as before described, as they may be arranged radially to the wheel, if desired.

I claim as my invention—

1. The combination, with a wheel having arms or buckets upon its periphery, of an inclosing-case having two or more side feed-openings, and two or more discharge-openings arranged in the outer or skirt portion of the bottom of the case, substantially as and for the purpose described.

2. An inclosing-case, having the discharge-openings arranged in the outer or skirt portion of the bottom of the case, and flaring outwardly, substantially as and for the purpose herein shown and described.

3. An annular gate, provided with the opposite openings $e$ and $e^2$ of the same size, and the opposite openings $e^1$ and $e^3$ differing in size from each other, and from the openings $e$ and $e^2$, substantially as and for the purpose described.

4. The combination, with a water-wheel and inclosing-case, of a removable ring, H, whereby the wheel can be adapted to flumes, or as a portable wheel, substantially as specified.

5. A portable water-wheel, consisting of the wheel B, having arms or buckets $b$, inclosing-case, provided with two or more feed and discharge openings, $a\ d$, annular gate E, and outer ring H, all combined and arranged to operate substantially as herein shown and described.

WARREN T. REASER.

Witnesses:
DE WITT C. ALLEN,
J. T. ALLEN.